INVENTORS
C. F. LAWLESS
W. O. SIMPSON
BY J. R. Hall
ATTORNEY

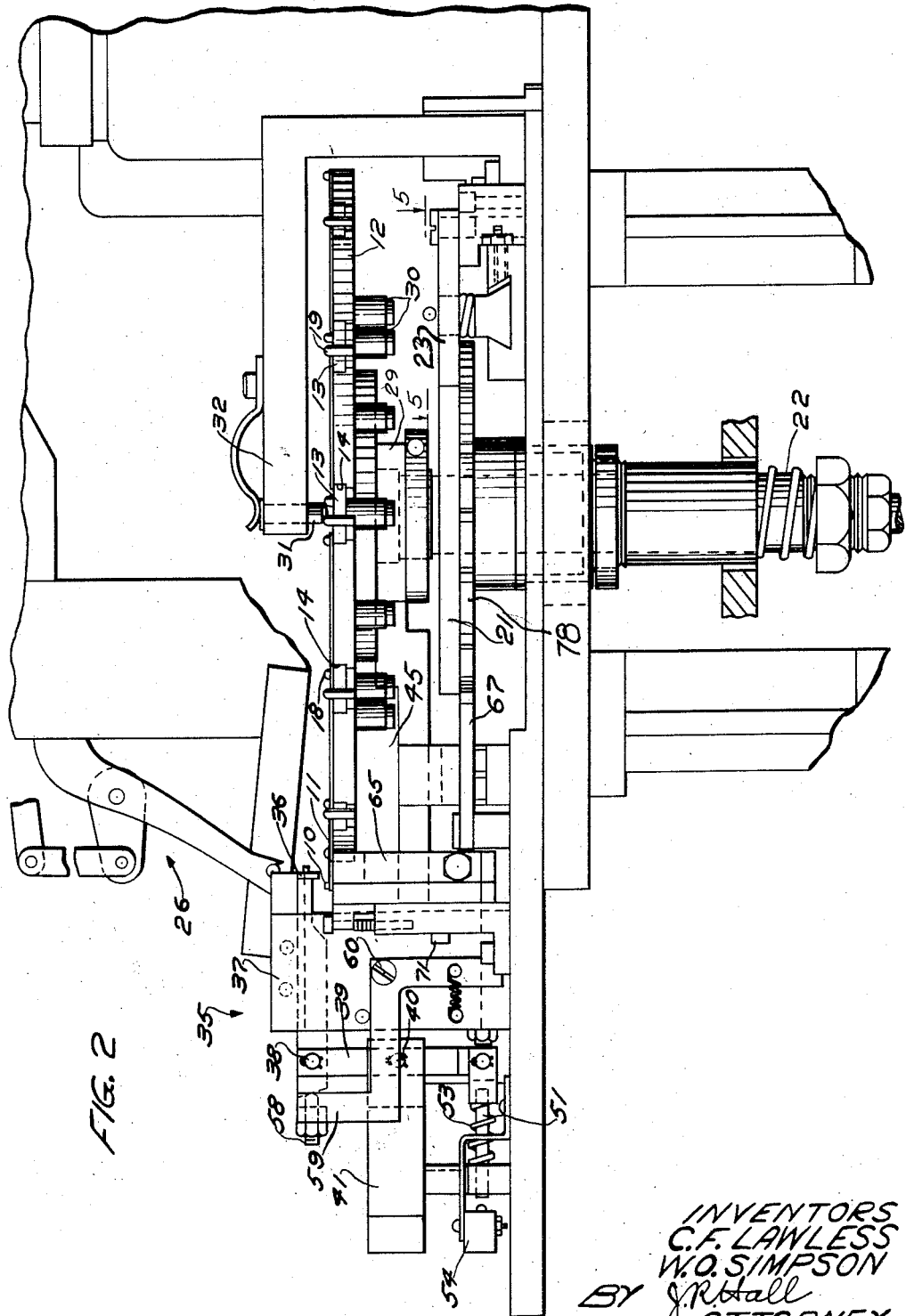

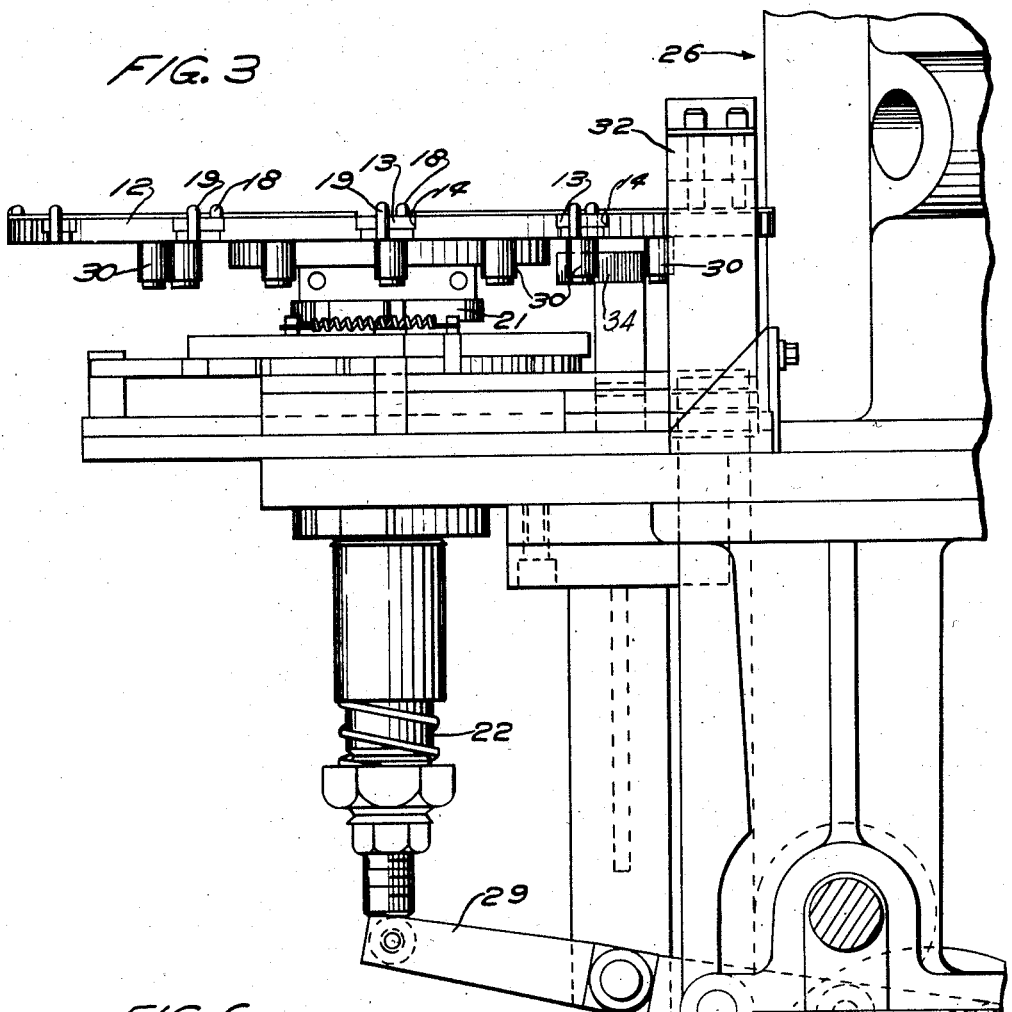
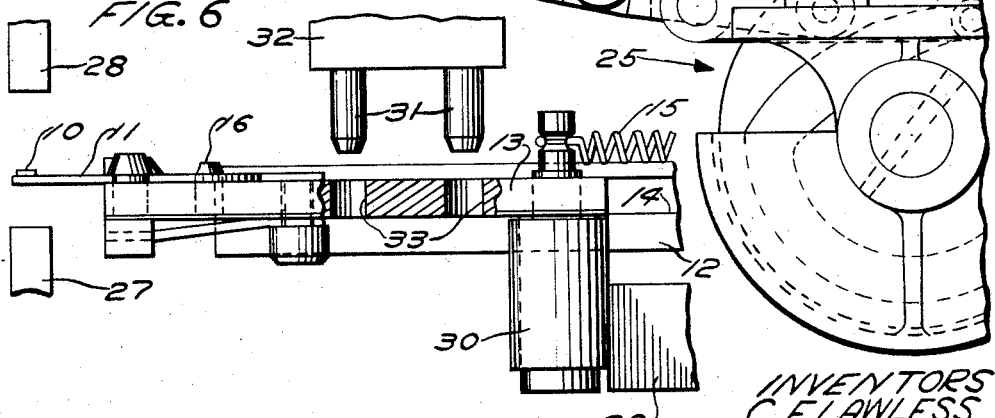

Oct. 7, 1958   C. F. LAWLESS ET AL   2,855,496
APPARATUS FOR WELDING ARTICLES

Filed Sept. 20, 1955   4 Sheets-Sheet 4

INVENTORS
C. F. LAWLESS
W. O. SIMPSON
BY J. R. Hall
ATTORNEY.

United States Patent Office 2,855,496
Patented Oct. 7, 1958

2,855,496

APPARATUS FOR WELDING ARTICLES

Charles F. Lawless and Warren O. Simpson, Indianapolis, Ind., assignors to Western Electric Company, Incorporated, New York, N. Y., a corporation of New York Application September 20, 1955, Serial No. 535,335

10 Claims. (Cl. 219—79)

This invention relates to apparatus for welding articles, and more particularly to apparatus for welding contacts to switch springs and testing the welds.

An object of the invention is to provide new and improved apparatus for welding articles.

Another object of the invention is to provide apparatus for sequentially welding a contact to a switch spring and testing the strength of the weld.

A further object of the invention is to provide apparatus for moving a switch spring to a welder, welding a contact to the spring, moving the contact to a test station and applying a shear test to the weld between the contact and the spring.

An apparatus illustrating certain features of the invention may include a carrier for carrying a switch spring to have a contact welded to one end thereof along a predetermined path extending past a welder, pushing the spring into the welder and moving the spring with one of the welding electrodes toward the other electrode. The welder welds the contact to the spring, which the carrier then retracts.

In an apparatus forming a more specific embodiment of the invention, a plurality of slides mounted radially on a turret carry springs sequentially to a welder and a tester, the slide at the welder is pushed outwardly from the turret to a position between two electrodes, the turret, the slide and a lower electrode are raised to bring a contact on the spring and the spring to welding contact between the electrodes, the weld is effected, the slide is drawn radially inward, and the welded article is moved by the turret to the tester where a hook engages the contact and pulls on it. If the weld is weak, the contact is broken off and the movement of the hook is utilized to change the operation of an ejector.

A complete understanding of the invention may be obtained from the following detailed description of an apparatus forming a specific embodiment thereof, when read in conjunction with the appended drawings, in which:

Fig. 2 is a fragmentary front elevation of the apparatus shown in Fig. 1;

Fig. 3 is a fragmentary side elevation of the apparatus shown in Fig. 1;

Fig. 6 is an enlarged vertical section taken along line 6—6 of Fig. 1.

Figure 1:
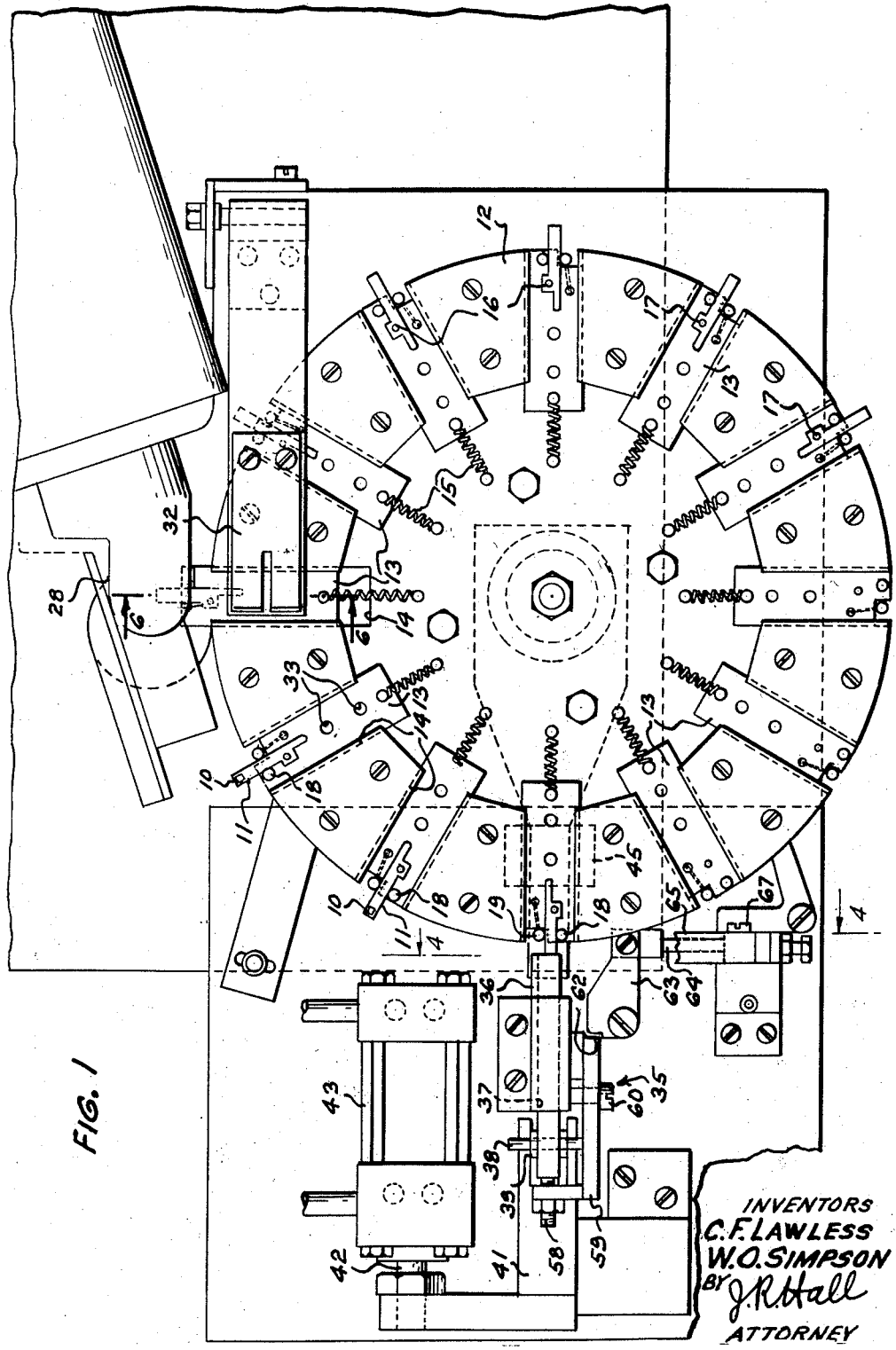
Fig. 1 is a top plan view of an apparatus forming one embodiment of the invention.

Referring now in detail to the drawings there is shown a machine for welding contacts 10 to telephonic switch springs 11 and for testing the shear strength of the welds between the contacts 10 and the springs 11. The apparatus includes a turret or dial 12 having spring-holders or slides 13 slidable along radial guideways 14 therein. The holders 13 are urged radially inwardly by tension springs 15 and have fixed locating pins 16 projecting through holes 17 in the springs 11. The springs 11 are centrally located and oriented on the holders 13 by the pins 16, fixed pins 18 and resiliently pressed pins 19 urged toward the pins 18. The holders hold the springs 11 in positions in which the tip end of the springs 11 project substantially beyond the holders and the dial.

Figure 5:
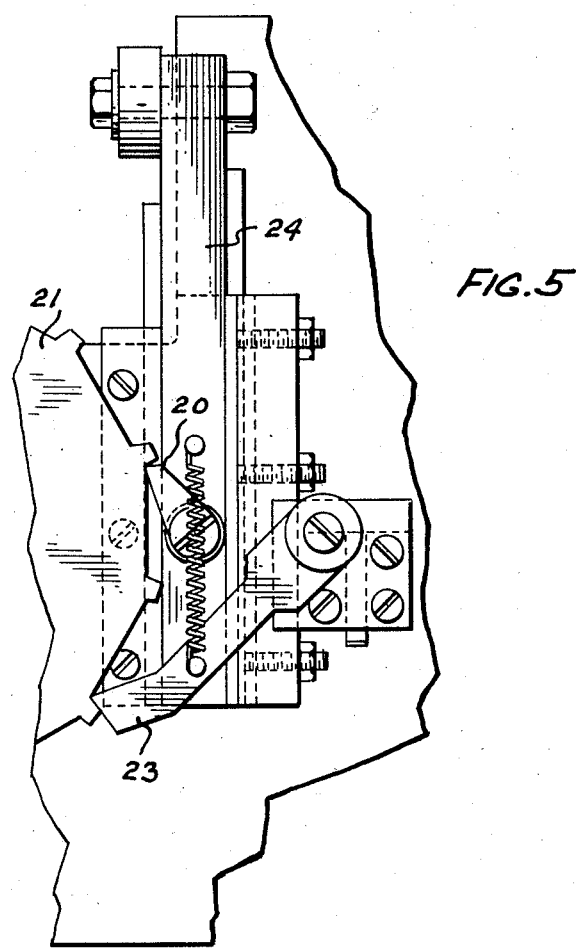
Fig. 5 is an enlarged horizontal section taken along line 5—5 of Fig. 2.

The turret 12 is rotated in a counterclockwise direction, as viewed in Fig. 1, by a pawl 20 (Fig. 5) and a ratchet wheel 21 splined to a shaft 22 fixed to the turret 12. The pawl 20 releases a locking pawl 23 on its feed stroke, and is driven by a slide 24 driven by a cam drive 25 of a welder 26 of a well known type. During the welding cycle, a lower electrode 27 is raised toward an upper electrode 28 by the cam drive 25, which also actuates a lever 29 to push the shaft 22 and the dial 12 upwardly to move the spring 11 at the welder and a contact placed on the spring 11 by the welder upwardly into contact with the upper electrode 28. As the slide 13 is moved upwardly, pins 31 having tapered ends and fixed on a fixed arm 32 enter holes 33 in the side to precisely orient the slide and spring 11 in the welder, the lower electrode is raised into contact with the spring 11, and the welder welds the contact to the spring. Also, as the dial 12 brings the spring 11 to a position between the electrodes, a fixed cam 34 is engaged by a follower pin 30 on the holder 13 and pushes the holder from a retracted position radially outwardly to project the tip of the spring 11 between the electrodes. After the welding, the dial 12 and the electrode 27 are lowered and the dial 12 is indexed, the follower 30 moving off the cam 34 and retracting.

The welded contact springs are moved step-by-step from the welder 26 to a testing device 35 with the welded portions of the springs projecting beyond the turret 12. Each contact spring is moved laterally under and is stopped beneath a hook 36 slidable in a fixed guideway 37 and a fixed stop 45 prevents movement of the slide to the left, as viewed in Fig. 2. The hook 36 is connected by a pin 38 pivotally to a lever 39 connected by a pin 40 to a pulling arm 41 mounted rigidly on a piston rod 42 operable by a cylinder 43. As the turret 12 stops the contact spring under the hook 36, the turret is moved upwardly to position the contact in lateral register with the hook 36. The cam drive 25 actuates the air supply to the cylinder 43 to move the piston rod 42 and the pulling arm 41 to the left, as viewed in Figs. 1 and 2, and the pin 40 is pulled to the left. If the weld between the contact 10 and the spring 11 is good, the lever 39 is pivoted in a clockwise direction, as viewed in Fig. 2, to move a plunger 51 to the left in a guide 52 against the action of a compression spring 53, and the plunger 51 actuates a limit switch 54, which reverses the supply of air to the cylinder 43 to move the piston rod 42 and the pulling arm 41 back to the positions in which they are shown in the drawings. This occurs prior to indexing the turret 12, and, on the indexing as the tested contact 10 and spring 11 are moved away from the hook 36 after the piston rod 42 and the pulling arm 41 have been returned to their starting positions to provide a slight clearance between the hook 36 and the contact 10, an ejector 65 in the path of the tip end of the spring 11 is engaged thereby and cams the spring out of the holder.

Figure 4:
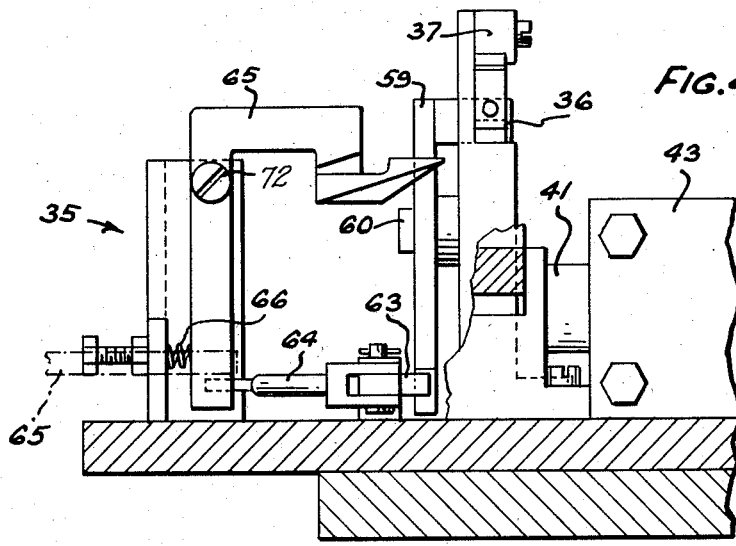
Fig. 4 is an enlarged fragmentary vertical section taken along line 4—4 of Fig. 1.

If when the puller 41 and the piston rod 42 are moved to the left, as viewed in Figs. 1 and 2, the weld between the contact 10 and the spring 11 is not satisfactory, the force applied to the weld, which is the result of the reaction of the spring 53, pulls the contact 10 off the spring 11 before the plunger 51 actuates the switch 54 and the lefthand end of the hook 36 engages an adjustment screw 58 secured to a lever 59 and swings the lever 59 around a mounting pin 60 in a counterclockwise direction. The lower end of the lever 59 engages a follower surface 62 on a lever 63 and swings the lever 63 in a clockwise direction, as viewed in Fig. 1. The lever 63 moves a link 64 downwardly, as viewed in Fig. 1, to move the ejector 65 against the action of a compression spring 66 in a clockwise direction, as viewed in Fig. 4, around a fixed mounting pin 72. The ejector 65 then is below the path of the portion of the spring 11 projecting beyond the periphery of the turret 12, and is held there by a spring-pressed latch 67 while the spring 11 is moved therepast by the indexing of the turret. In a test in which the weld fails, the lever 59 is pivoted to a position moving the ejector 65 out of ejection position and the ejector is latched in its retracted or inoperative position. Then the lever 59 engages a stop 71 (Fig. 3), and the continued movement of the puller 41 to the left moves the plunger 53 to the left to actuate the switch 54. Then the cylinder 43 is reversed and returns to normal. Then the dial 12 is indexed and the dial moves the spring 11 past the ejector 65 so that the spring 11 is not tilted off the dial, and an operator removes it. After the defectively welded spring has been moved past the retracted ejector 65, a cam 78 moves the latch 67 away from the ejector 65 which is spring-returned to its normal operative position. The unsatisfactory springs after they are tested pass on beyond the testing device 35 and are removed at a subsequent point in the path of the turret by an operator.

The above-described apparatus serves to effectively weld contacts to springs and test welds between the contacts 10 and the springs 11 and automatically separates springs in which a weld has failed from the satisfactory ones.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for welding and testing articles, which comprises a welder having a pair of opposed electrodes, a tester including a tensioning device, stepping means for moving an article along a predetermined path offset from the welder and past said tester, cam means rendered effective by the stepping means for moving the article laterally of the path to a position between the electrodes, second cam means for moving the article and one of the electrodes toward the other electrode to effectuate a weld, and means actuated by said second cam means for engaging said tensioning device with the welded article.

2. A welding apparatus, which comprises a welder having a pair of opposed vertically disposed electrodes, a testing device for applying tension to a welded article, a rotatable dial having radial guideways therein, slides mounted in the guideways for holding contact springs in positions in which tip ends of the springs extend beyond the slides, means mounting the dial rotatably on a vertical axis and movable vertically to a position in which the periphery of the dial is adjacent to the electrodes and in register with the tension testing device, means for stepping the dial to position the slides one after another near the electrodes, means for pushing each slide at the electrodes outwardly relative to the dial to position the tip of the spring between the electrodes, cam means for moving the dial and one of the electrodes toward the other electrode to effectuate a weld, means adjacent the tension testing device for holding said slides against sliding movement, and means operated by said cam means for actuating said tension testing device.

3. An apparatus for testing welds of contact elements welded to contact springs which comprises a turret for holding shanks of contact springs in positions extending radially outwardly therefrom, a shiftably mounted tester spaced from the turret, means for advancing the turret step by step to position the contact elements seriatim in spaced axial alignment with the tester, means for moving the turret axially to move each positioned contact element into lateral alignment with the tester, and means for laterally shifting the tester to engage and apply force to each welded contact element.

4. An apparatus for testing welds of contact springs, which comprises a carrier for holding a spring having a contact on one end thereof and moving the spring along a predetermined path, a hook for engaging the contact, means for pulling the hook to apply a force to the contact tending to shear the contact from the spring, an ejector for removing the spring from the carrier, and means movable by movement of the hook-pulling means for actuating the ejector.

5. An apparatus for testing welds of contact springs, which comprises a carrier for holding a spring having a contact on one end thereof and moving the spring along a predetermined path, a hook for engaging the contact, means for pulling the hook to apply a force to the contact tending to shear the contact from the spring, an ejector normally operative to remove the spring from the carrier, and means movable by movement of the hook-pulling means on failure of the weld for rendering the ejector inoperative.

6. An apparatus for testing welds, which comprises a turret for holding shanks of contact springs in positions projecting radially outwardly therefrom, means for moving the turret step-by-step to move the springs seriatim to a test station, a hook for engaging contacts welded to the springs, means for moving the turret facewise to move a contact into the path of the hook, a lever connected at one end to the hook, a spring-pressed plunger connected pivotally to the other end of the lever, pneumatic means connected pivotally to the central portion of the lever for pulling the lever in a direction against the action of the spring-pressed plunger and pulling the hook against a contact to apply a testing force to the weld between the contact and the spring, switch means operable by the plunger if the weld holds for reversing the pneumatic means and starting a step of the turret, a second lever movable by movement of the hook, a pivotally mounted ejector for engaging the portion of the contact spring projecting beyond the turret to eject the contact spring from the turret, and linkage means connecting the second lever and the ejector for actuating the ejector.

7. An apparatus for testing welds, which comprises a turret for holding shanks of contact springs in positions projecting radially outwardly therefrom, means for moving the turret step-by-step to move the springs seriatim to a test station, a hook for engaging contacts welded to the springs, a lever connected at one end to the hook, a spring-pressed plunger connected pivotally to the other end of the lever, pneumatic means connected pivotally to the central portion of the lever for pulling the lever in a direction against the action of the spring-pressed plunger and pulling the hook against a contact to apply a testing force to the weld between the contact and the spring, switch means operable by the plunger for reversing the pneumatic means and starting a step of the turret, a second lever movable by movement of the hook when the weld fails, and an ejector controlled by the second lever for engaging the portion of the contact spring projecting beyond the turret to eject the contact spring from the turret.

8. In an apparatus for subjecting articles to two operations, a turret having a plurality of movable article holders mounted thereon, a first work member axially spaced offset of said turret, a second work member axially spaced from said turret, means for cyclically operating said first work member, means actuated by said cyclically operating means for advancing said turret step-by-step, cam means rendered effective by the movement of the turret for moving each successive holder to position each successive article in register with said first work member, and means operated by said cyclically operating means for axially moving said turret to position one article in engagement with said first work member and a second article in engagement with said second work member.

9. In an apparatus for sequentially welding elements to articles and testing the strength of the welds, a cyclically operable welding machine having a welding electrode, a testing device having a force applying element, a turret spaced from said welding electrode and said force applying member for carrying articles, means actuated by the welding machine for indexing said turret to move each successive article in register with said welding electrode and force applying member, means actuated by said welding machine for axially moving said turret to move an article into position to have an element welded thereto, said turret moving a welded element into position to be engaged by said force applying member, and means actuated by said welding machine for moving said member to apply a force to said welded element.

10. In an apparatus as defined in claim 9 including an ejector for removing said welded articles, and means operated by the force applying means for rendering said ejector ineffective.

References Cited in the file of this patent

UNITED STATES PATENTS

| | | |
|---|---|---|
| 1,303,906 | Jobski | May 20, 1919 |
| 1,635,536 | Butler | July 12, 1927 |
| 1,869,804 | Eksergian | Aug. 2, 1932 |
| 2,007,698 | Tear | July 9, 1935 |
| 2,100,502 | Campbell et al. | Nov. 30, 1937 |
| 2,261,783 | Stull | Nov. 4, 1941 |
| 2,340,360 | Alden | Feb. 1, 1944 |
| 2,340,448 | Andren | Feb. 1, 1944 |
| 2,353,056 | Martindell | July 4, 1944 |